US006741681B2

(12) United States Patent
Meyer

(10) Patent No.: US 6,741,681 B2
(45) Date of Patent: May 25, 2004

(54) METHOD FOR ACQUISITION OF DATA PROVIDED ON AN INTERNET SITE AND FOR DATA COMMUNICATION TO AN INTERNET SITE

(75) Inventor: Jochen Meyer, Ahaus (DE)

(73) Assignee: mediaBEAM GmbH, Ahaus (DE)

( * ) Notice: Subject to any disclaimer, the term of this patent is extended or adjusted under 35 U.S.C. 154(b) by 0 days.

(21) Appl. No.: 10/277,745

(22) Filed: Oct. 23, 2002

(65) Prior Publication Data

US 2003/0133546 A1 Jul. 17, 2003

(30) Foreign Application Priority Data

Jan. 16, 2002 (DE) ........................................ 102 01 623

(51) Int. Cl.[7] ............................................... H04M 11/00

(52) U.S. Cl. ............................... 379/93.12; 379/90.01; 370/352

(58) Field of Search .......................... 379/90.01, 93.12, 379/93.13, 93.15, 88.14, 88.17; 705/37

(56) References Cited

U.S. PATENT DOCUMENTS

| | | | | | |
|---|---|---|---|---|---|
| 5,953,392 | A | * | 9/1999 | Rhie et al. | 379/88.13 |
| 6,349,132 | B1 | * | 2/2002 | Wesemann et al. | 379/33.17 |
| 6,594,348 | B1 | * | 7/2003 | Bjurstrom et al. | 379/88.13 |
| 2001/0040886 | A1 | * | 11/2001 | Jimenez et al. | 370/352 |
| 2003/0041013 | A1 | * | 2/2003 | Grey et al. | 705/37 |
| 2003/0126061 | A1 | * | 7/2003 | Brett et al. | 705/37 |

FOREIGN PATENT DOCUMENTS

| | | | |
|---|---|---|---|
| DE | 198 43 203 | A1 | 3/2000 |
| DE | 698 00 807 | T2 | 11/2001 |
| EP | 1 012 764 | B1 | 6/2000 |
| WO | WO 98/35491 | | 8/1998 |

OTHER PUBLICATIONS

Freitag, Reinhild, Zurück in Die Zukunft. In: Office Journal May 2000, pp. 46, 47.

* cited by examiner

*Primary Examiner*—Stella Woo
(74) *Attorney, Agent, or Firm*—Nixon Peabody LLP; David S. Safran

(57) ABSTRACT

A method for data acquisition of data provided on an Internet site and a method for data communication to an Internet site is described. Data communication to the Internet site is performed in a predetermined data communication format and the Internet site is maintained on an Internet server. The data provided on the Internet site is automatically transformed at least partially into speech, and the data transformed into speech is communicated by speech telephony connection between a server-side speech telephony device and a remote speech telephony device of a user. The user is automatically offered data communication by a speech telephony connection between a remote speech telephony device of the user and a server-side speech telephony device using acoustic signals input by the user. The acoustic signals input by the user are automatically transformed into the predetermined data communication format and are communicated to the Internet site in this predetermined data communication format. Using this method, telephonic participation in an Internet auction is possible.

11 Claims, 1 Drawing Sheet

METHOD FOR ACQUISITION OF DATA PROVIDED ON AN INTERNET SITE AND FOR DATA COMMUNICATION TO AN INTERNET SITE

BACKGROUND OF THE INVENTION

1. Field of the Invention

The present invention relates to the field of data acquisition from Internet sites and data communication to Internet sites using a predetermined data communication format. The data acquired from the Internet sites are automatically transformed into speech and communicated by speech telephony to users. Similarly, the data communicated to Internet sites is transformed from speech into a predetermined data communication format and transmitted to the Internet site for use by the Internet server. For example, telephonic participation in an Internet auction is possible using the above method.

2. Description of Related Art

The present invention relates to a method for acquisition of data provided on and Internet site and for data communication to an Internet site in a predetermined data communication format, the Internet site being maintained on an Internet server.

Presently, any document available on the Internet that may be displayed and observed using a suitable program, such as a browser, is to be considered an Internet site. Programs for displaying and observing Internet sites of the type under discussion may be used on vastly different devices, such as typical personal computers (PCs), mobile telephones (cellular phones), and handhelds or PDAs (personal digital assistants). The programs used on the individual devices for displaying and viewing the Internet sites are then, of course, different from one another, as are the display and transmission standards used. One example of these configurations is that of a typical personal computer, connected to the Internet via a DSL line. Using this personal computer, an Internet site is accessedvia the TCP/IP protocol, the Internet site being essentially in HTML code and JavaScript. Internet sites accessible using a WAP cellular phone must correspondingly be in WML format. The same is true for devices and formats recently available, such as XML.

A similar state of affairs to that described above in relation to the acquisition of data provided on an Internet site also applies for data communication to an Internet site. Data communication to an Internet site corresponds to data communication to the Internet server upon which the Internet site is maintained. The computer process the Internet site is based on or other data on the Internet server may be changed or supplemented. The most frequently used procedure is one where fields in a form are filled out using the keyboard of a personal computer, and these fields are displayed to the user of the personal computer. The data input by the user using the keyboard is then processed further or at least stored as a function of the title of the field in the Internet server.

The above method is problematic in that an Internet-capable device must always be provided to exchange data in alphanumerical and numerical forms to effect the acquisition of data provided by an Internet site and to effect the communication of data to an Internet site. A bidirectional Internet-capable device using a connection to the Internet is typically employed. However, this leads to the user being excluded from access to the Internet when no such Internet-capable device is available to him. The user is thereby unable to access important data displayed on a specific Internet site and is unable to communicate data to a specific Internet site during this time.

Such problems may particularly occur and may be very serious if the user participates in an Internet auction and the close of the Internet auction occurs at a time when the user has no access to an Internet-capable device as described above. The user may then possibly be outbid shortly before the end of Internet auction, without being able to react to this outbidding by increasing his own offer.

SUMMARY OF THE INVENTION

An object of the present invention is to provide a method for data acquisition of data provided by an Internet site and a similar method for data communication to an Internet site, where universal access to the Internet site is achieved, even without an Internet-capable device.

To achieve this object, the method employed according to the present invention is distinguished from the prior art in that the data provided by the Internet site is automatically transformed at least partially into speech. The data transformed into speech is the communicated by a speech telephony connection between a server-side speech telephony device and a remote speech telephony device of a user. The user is automatically offered data communication by speech telephony connection between a remote speech telephony device of the user and a server-side speech telephony device using acoustic signals input by the user. The acoustic signals input by the user are automatically converted into the predetermined data communication format and are communicated to the Internet site in this predetermined data communication format.

An essential point of the method according to the present invention is the bidirectional communication of data using speech telephony. On the user side, only a telephone, such as a fixed network telephone or a mobile telephone, must be supplied.

In the present invention, speech telephony means such a connection, using a telephone or other device in which acoustic signals, that is, particularly the spoken word, are communicated, as distinguished from a modem or fax connection. However, speech telephony also includes the communication of artificially generated tones, such as DTMF dial tones. In principle, speech telephony may also be Internet telephony, the method according to the present invention being of limited advantage for an existing typical Internet access.

In the method according to the present invention, the Internet site from which the data for data acquisition is provided and the Internet site to which data is to be communicated may be identical, but this is not absolutely necessary. The method according to the present invention is therefore usable for a case in which the Internet site providing the data provided is different from the Internet site to which the data is to be communicated.

Finally, it is to be noted that the transformation into speech of the data provided on the Internet site according to the present invention amounts to reading aloud parts of the Internet site. For this purpose, a parsing, that is, reading in the data of interest on Internet site, and conversion of the data, which is generally in a text format, such as HTML, into speech is necessary. Corresponding devices and methods to perform this parsing are well known from the related art. The transformation of the data from the Internet site into speech is novel.

In principle, the format of the data provided on Internet site might be restricted to a predetermined format, so that a fixed conversion of the Internet site having the provided data into speech may be employed. However, according to a preferred embodiment of the present invention, the format of the data provided by the Internet site is recognized automatically and conversion of this data into speech is performed as a function of its automatically recognized format. In this way, universal use of the method according to the present invention is possible.

For the transformation of the data provided on the Internet site into speech, two alternative preferred embodiments of the present invention are provided. Specifically, according to a first preferred embodiment of the present invention, the transformation of the data provided by the Internet site into speech is carried out by the Internet server itself. In this manner, in addition to access to the Internet site in its corresponding format, direct access to the original data upon which the Internet site is based on and upon the original process which the Internet site is based is possible. This is particularly advantageous in regard to the conversion speed of alphanumeric data and corresponding speech data. In addition to numerical or alphanumeric data, corresponding speech information data may be stored in parallel on the Internet server in this way, so that the need to convert the data provided on the Internet site into speech in real time may be avoided.

According to an alternative second preferred embodiment of the present invention, the transformation of the data provided by an Internet site into speech is performed by a communication server, which is different from the Internet server but connected thereto. In this case, the communication server accesses the Internet site itself, for example, and therefore has the same access to the Internet site as a browser. Therefore, no access of the communication server to the process upon which the Internet site is based is necessary in any case since the transformation and communication method is possible even from outside the Internet server. This means that the method according to the present invention is applicable without the operator of the Internet server having to make appropriate arrangements for access to his Internet server from outside, i.e., from outside the LAN environment of his Internet server. It is sufficient merely to set up an appropriate communication server, which is operated according to the method of the present invention. In this preferred embodiment of the present invention, in which a communication server is provided, the server-side speech telephony device is a speech telephony device on the communication server.

Two alternative embodiments of the present invention are also possible with regard to the automatic transformation of the data provided on the Internet site into speech. Thus, according to a first preferred embodiment of the present invention, the automatic transformation of the data provided on the Internet site into speech is performed automatically without conversion. In a concrete case, this means that what is displayed as text is read aloud directly. According to an alternative second preferred embodiment of the present invention, however, the automatic transformation of the data provided on the Internet site into speech is performed using a conversion, particularly through automatic translation into another predetermined language or through automatic coding using a predetermined code. The automatic translation into another predetermined language is of particular significance, since in this way a user is given the possibility of establishing contact even to those Internet sites that are written in a language the user does not know.

In principle, it is possible to initiate the speech telephony connection between the server-side speech telephony device and the remote speech telephony device of the user manually, specifically by the user calling the speech telephony device of the Internet server or of the communication server. However, according to a preferred embodiment of the present invention, the speech telephony connection between the server-side speech telephony device and the remote speech telephony device of the user is established automatically. This corresponds to the speech telephony device connected to the Internet server or the communication server calling the predetermined speech telephony device of the user. In this manner the call of the speech telephony device connected to the Internet server or the communication server is automatically connected to the predetermined telephone device of the user without the manual approval of the user. If an automatic connection were not effected, the user would naturally have to manually accept the call.

Furthermore, in this preferred embodiment, the automatic establishment of the speech telephony connection between the server-side speech telephony device and the remote speech telephony device of the user may be prompted by a specific event on the Internet server or on the communication at a specific time.

Through automatic establishment of the speech telephony connection between the server-side speech telephony device and the remote speech telephony device of the user where the speech telephony connection is initiated on the server side, very high security is already present. This security is actually established with the predetermined speech telephony device and therefore with the correct user of a speech telephony connection. However, according to a preferred embodiment of the present invention, the user is required, at least once, to confirm the connection between the server-side speech telephony device and the remote speech telephony device of the user using a code. The code indicated by the user is automatically checked for correspondence against a code predetermined by the user himself. If the code input by the user does not correspond to the predetermined code, the connection between the server-side speech telephony device and the remote speech telephony device of the user is terminated automatically. In this way, an additional security step is installed, which makes access by a non-authorized person to the Internet site of the type under discussion more difficult.

The code confirmation by the user may be performed at different times and even more than once. In particular, if the code is input incorrectly, only a finite number of new attempts to input the code are possible, preferably only two.

The method according to the present invention is particularly of interest to those Internet sites upon which temporally changing data is displayed. In such cases, it is particularly preferable for the automatic establishment of the speech telephony connection between the server-side speech telephony device and the remote speech telephony device of the user to be prompted in the event of correspondence of the temporally changing data with predetermined data. Furthermore, it is particularly preferable in this case for the user to be informed automatically of the currently valid data via the speech telephony device. Finally, in order to keep the number of calls low, the user is automatically informed of changes of the temporally changing data via the speech telephony connection.

As already described initially, a field of particular interest for many users is the field of Internet auctions. Correspondingly, a preferred embodiment of the present invention is shown where the Internet site on the Internet server is an Internet site on which the course of an Internet auction is displayed. In this case, it is also particularly preferable for the automatic establishment of the speech telephony connection between the server-side speech telephony device and the remote speech telephony device of the user to be prompted at a predetermined time, preferably two minutes, before the end of the Internet auction.

After establishment of a connection to the speech telephony device, the user is automatically informed of the current state of the Internet auction via this device, namely how high the highest bid is and whether this bid is a bid of the user. Furthermore, according to a preferred embodiment of the present invention, the user is automatically informed of the progress of the Internet auction via the speech telephony connection, particularly of changes of the state of the Internet auction. In this manner, the user is automatically requested to provide a new bid via the speech telephony connection in the event his previous bid is outbid. The submission of a new bid of the user via the speech telephony connection is automatically taken into consideration in the Internet auction occurring on the Internet site. The submission of a new bid is then performed via acoustic signals, such as speech or DTMF tones.

Finally, according to a preferred embodiment of the present invention, the user is automatically informed of the outcome of the Internet auction via the speech telephony connection, namely whether he has won the auction or has been outbid by another bidder.

There are many possibilities for designing and refining the method according to the present invention. For this purpose, reference is made to the following detailed description of a preferred exemplary embodiment of the present invention.

DETAILED DESCRIPTION OF THE INVENTION

Figure 1:
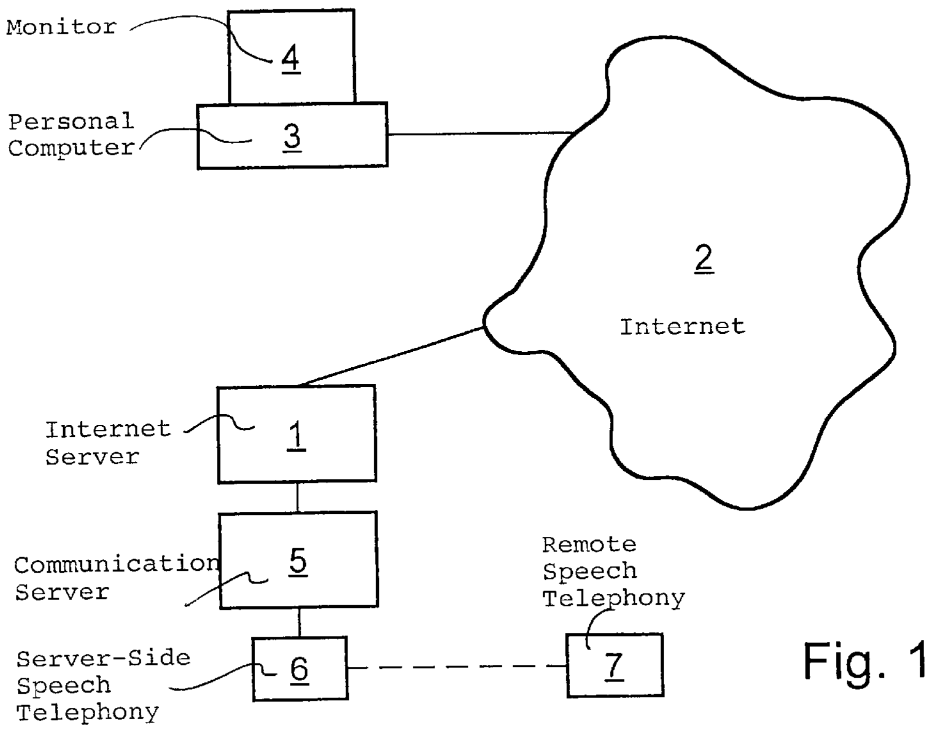
FIG. 1 schematically shows a system for carrying out a method according to a preferred exemplary embodiment of the present invention.

A schematic depiction of a system for carrying out a method according to a preferred exemplary embodiment of the present invention is shown in FIG. 1. The method according to the preferred exemplary embodiment of the present invention is a method that is used in connection with an Internet auction.

Internet auctions are generally designed in such a way that an article is offered for sale via the Internet, that is, typically on an Internet site. In this case, the Internet auction has a predetermined running time, i.e., a precisely predetermined end. Until now, interested bidders provided bids by inputting the corresponding bids via the Internet site. The one who had provided the highest bid at the end of the Internet auction obtained the article.

According to the preferred exemplary embodiment of the present invention, an Internet server 1 is provided as a central device that handles the process the Internet auction is based on. This server is accessible via Internet 2 using Internet-capable devices, such as a personal computer 3, so that the Internet site may be displayed on a monitor 4 of personal computer 3. The offer may be provided using a personal computer 3, which is connected to Internet server 1 via Internet 2. In addition, the interested bidders may also provide their bids and observe the course of the Internet auction via their respective personal computers 3, which are also connected via Internet 2 to Internet server 1. In principle, access to the Internet site using multiple personal computers 3 or other Internet-capable devices—even simultaneously—is therefore possible. For the sake of simplicity, however, only one personal computer 3, which may access Internet server 1 via Internet 2, is illustrated in FIG. 1.

For the case in which a bidder has no access to his personal computer 3 or another Internet-capable device, at least in the "hot phase", i.e. at the end of the Internet auction, according to the system shown in FIG. 1, a communication server 5 is connected to Internet server 1, a server-side speech telephony device 6 being connected to communication server 5. Using this server-side speech telephony device 6, a speech telephony connection may be established to a remote speech telephony device 7 of a user (not shown in more detail). In the present case, it is shown that communication server 5 is connected to Internet server 1 directly, i.e. not via Internet 2. In principle, of course, communication server 5 may also be connected to Internet server 1 via Internet 2.

The sequence of the method according to the preferred exemplary embodiment of the present invention is therefore arranged as follows: a potential bidder, referred to as a user in the following, is interested in a specific Internet auction. The user does not want to miss this Internet auction and above all does not want to miss the Internet auction toward the end in the "hot phase," which begins approximately two minutes before the end of the Internet auction. The user thereby arranges it on the Internet site, on which the corresponding Internet auction is offered, so that he will be called on his mobile telephone, that is, remote speech telephony device 7, shortly before the end of the Internet auction.

This arrangement of a "call service" is carried out by the potential bidder in a typical way, specifically in that he makes corresponding inputs using his personal computer 3, which is connected to Internet server 1 via Internet 2. When arranging this call service, the user may also, for legal reasons, register once again on a separate Internet site using his user name and his password, which identifies him as an authorized auction participant. The user then also receives the possibility of selecting a PIN (personal identification number) in addition to the telephone number of his mobile telephone, which he requires as a further proof of identity for the call service to occur. In this way, the security is further elevated so that only the authorized bidder, namely the user, actually participates telephonically in the Internet auction via the call service. There is already a certain security in this regard in that the user has already essentially precluded wrong numbers when establishing the speech telephony connection between server-side speech telephony device 6 and user-side speech telephony device 7 by indicating his telephone number.

If the Internet auction under discussion has now progressed sufficiently far that it is approaching its end, the call to the mobile telephone of the user therefore occurs two minutes before the intended end of the Internet auction. Of course, this call may also be made on a fixed network telephone of the user. The user accepts the call and is then faced with the following call sequence:

After a short greeting, the user called is informed of the approaching end of his Internet auction. He is then informed of the amount of the current maximum bid for the article to be auctioned and whether he, the user, bid this highest amount. Furthermore, the user may be informed of how many bids have already been provided and what amount is to be bid in order to outbid the highest bid up to this point. The user may now determine how he will proceed.

Using a predetermined button, he has the possibility of simply observing the auction further, i.e., having himself informed via the speech telephony connection whether further bids are provided and for how much. Using another button, the user has the possibility of declaring his willingness for further bidding. After pressing this button, the bidder is asked to input the PIN, described above in more detail. This is done for security reasons, in order to establish whether the telephone of the user has actually been called and this telephone is actually being operated by the person who desired this, namely the user. After the PIN has been input correctly, a bid may then in turn be provided using another button. This may be performed either through step-by-step increases or through free input of an amount in legal currency. Subsequently, the user is asked to confirm the input through another press of a button. When this has occurred, the user is informed that the bid has been provided and the result is now again communicated. In this case, the bidder may be outbid automatically by another bidder immediately afterward, particularly if auction agents are used, which outbid the bids of other bidders for a bidder automatically, each time by a predetermined amount up to a maximum amount.

The user then has the possibility of repeating the method sequence described above until the end of the auction has been reached. He is informed directly by telephone of its result, i.e., whether the user has won the auction or whether another bidder has outbid him. The connection is then automatically ended by server-side speech telephony device 6.

For communication via the speech telephony connection, speech stored on the side of the communication server is used, namely for the static areas, such as greeting, amounts, etc., and synthetic speech is used for the individual areas, such as the article description. Control is performed on the user side through speech commands or through DTMF dial tones of the telephone.

A redundant environment of servers, which is equipped with CTI technology (computer telephone integration), may be concealed behind the system illustrated in FIG. 1 in a schematic and simplified version. This environment may carry out multiple calls and handle the multiple speech telephony connections arising therefrom. In this case, integrated speech or voice boards are used that are linked to intelligent technology, are able to establish speech telephony connections automatically, are able to send content such as previously spoken speech recordings, and are able to react to interactions of the person called.

Figure 2:
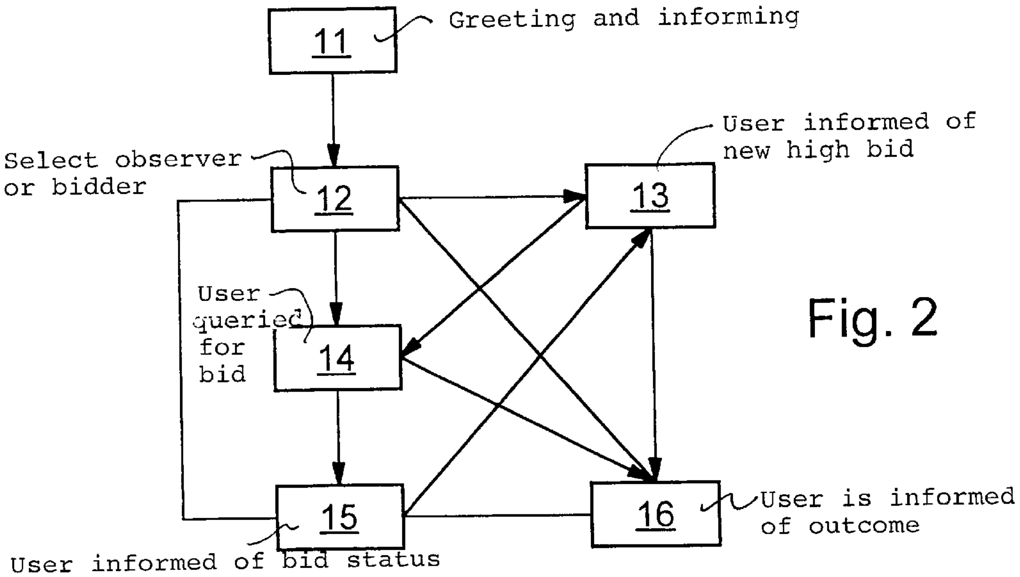
FIG. 2 shows a flowchart of the method according to the preferred exemplary embodiment of the present invention.

The cycle of a call described above is illustrated again in FIG. 2 in the form of a flowchart. As may be seen in FIG. 2, the greeting and informing about the state of an Internet auction are performed in a first step 11. In a following step 12, the user may decide whether he wishes to bid further or merely observe the Internet auction. If the user merely observes the Internet auction, he is regularly informed what the highest bid is. The user is particularly informed if a new highest bid is provided. This occurs in step 13.

However, if the user has declared that he wishes to bid further, he is asked in step 14 to provide a bid. The bid is provided as described above. After the bid is provided, the user is informed in step 15 whether his bid now leads, i.e., represents the highest bid, or whether he has been outbid again by another bidder. If the bid of the user leads, step 13 automatically follows, and the auction is observed further. The user may change back from this observation state to step 14, which allows him to provide a bid, at any time by pressing an appropriate button. The user will typically make use of this possibility if he has been outbid, after his bid has led, and he now wishes to provide a bid again.

However, if the user is informed in step 15 that his bid was not successful, i.e., he has already been outbid by another bidder, there is an automatic switch to step 12, and the user may decide again whether he wishes to bid or only remain informed about the course of the auction.

Finally, there is an automatic change to step 16, in which the user is informed of the outcome of the auction, i.e., is informed of whether he is the highest bidder or has been outbid by another bidder, from all steps 12 to 15 directly after the end of the auction.

I claim:

1. A method for data acquisition of data provided on an Internet site and for data communication to an Internet site in a predetermined data communication format, the Internet site being maintained on an Internet server and being an Internet site on which the course of an Internet auction is shown, the method comprising the following steps:

automatically providing data communication by a speech telephony connection between a server-side speech telephony device and a remote speech telephony device of a user at a specific time before the end of the auction;

automatically transforming the data provided on the Internet site at least partially into speech;

communicating the data transformed into speech by the speech telephony connection between the server-side speech telephony device and the remote speech telephony device of the user in order to inform the user of the amount of the current maximum bid and whether the user bid this highest amount;

automatically asking the user, via the speech telephony connection, to provide a new bid via the speech telephony connection in the event his bid is outbid;

providing the user with the possibility to input acoustic signals for further bidding;

communicating any acoustic signals communicated by the speech telephony connection;

transforming any acoustic signals communicated by the speech telephony connection into data in the predetermined data communication format;

communicating the transformed data in the predetermined data communication format to the Internet site in order to provide the new bid to the auction;

automatically taking into consideration, in the Internet auction occurring on the Internet site, the new bid of the user provided via the speech telephony connection.

2. The method according to claim 1, further comprising the additional steps of:

automatically recognizing the format of the data provided on the Internet site; and transforming the recognized data into speech as a function of the automatically recognized format.

3. The method according to claim 2, further comprising the additional step of:

transforming the data provided on the Internet site into speech by the Internet server itself.

4. The method according to claim 2, further comprising the additional step of:

transforming the data provided on the Internet site into speech by a communication server, different from the Internet server, but connected to the Internet server.

5. The method according to claim 1, further comprising the following step:

automatically informing the user of the outcome of the Internet auction via the speech telephony connection.

6. The method according to claim 1, further comprising the additional step of:

transforming the data provided on the Internet site into speech by the Internet server itself.

7. The method according to claim 1, further comprising the additional step of:

transforming the data provided on the Internet site into speech by a communication server, different from the Internet server, but connected to the Internet server.

8. The method according to claim 2, further comprising the following step:

automatically informing the user of the outcome of the Internet auction via the speech telephony connection.

9. A method for data acquisition of data provided on an Internet site and for data communication to an Internet site in a predetermined data communication format, the Internet site being maintained on an Internet server and being an Internet site on which the course of an Internet auction is shown, the method comprising the following steps:

automatically providing data communication by a speech telephony connection between a server-side speech telephony device and a remote speech telephony device of a user at a specific time before the end of the auction;

automatically transforming the data provided on the Internet site at least partially into speech;

communicating the data transformed into speech by the speech telephony connection between the server-side speech telephony device and the remote speech telephony device of the user in order to inform the user of the amount of the current maximum bid and whether the user bid this highest amount;

automatically asking the user, via the speech telephony connection, to provide a new bid via the speech telephony connection in the event his bid is outbid;

providing the user with the possibility to input acoustic signals for further bidding;

communicating any acoustic signals communicated by the speech telephony connection;

transforming any acoustic signals communicated by the speech telephony connection into data in the predetermined data communication format;

communicating the transformed data in the predetermined data communication format to the Internet site in order to provide the new bid to the auction;

automatically taking into consideration, in the Internet auction occurring on the Internet site, the new bid of the user provided via the speech telephony connection;

repeating the method sequence above until the end of the auction is reached;

automatically informing the user of the result of the auction via the speech telephony connection;

automatically ending the connection by the server-side speech telephony device.

10. The method according to claim 9, further comprising the additional steps of:

automatically recognizing the format of the data provided on the Internet site; and transforming the recognized data into speech as a function of the automatically recognized format.

11. The method according to claim 10, further comprising the additional step of:

transforming the data provided on the Internet site into speech by the Internet server itself.

* * * * *